Patented Sept. 1, 1953

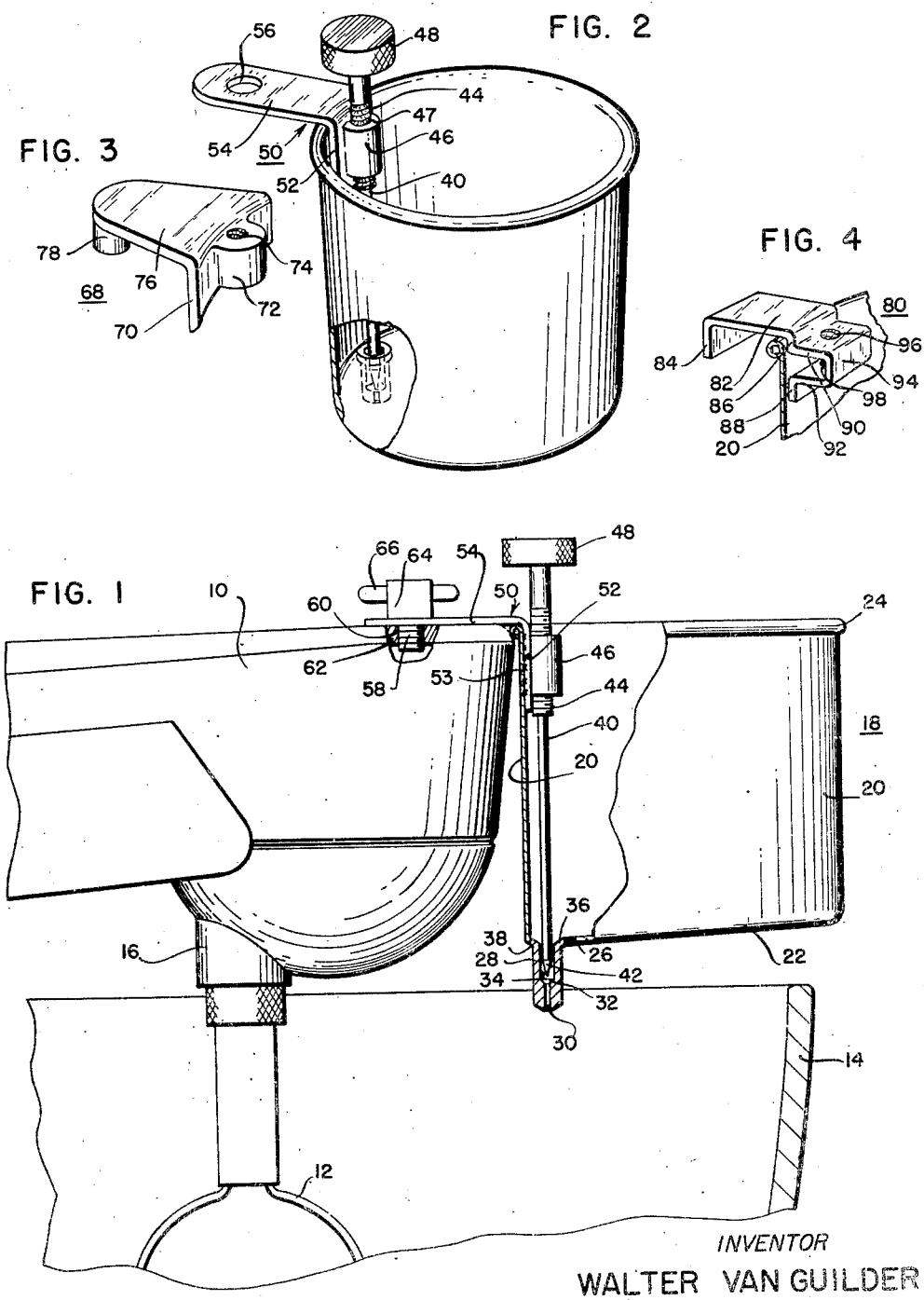

2,650,741

UNITED STATES PATENT OFFICE 2,650,741

OIL DROPPER WITH BRACKET FOR ATTACHMENT TO FOOD MIXERS

Walter Van Guilder, River Forest, Ill., assignor to General Mills, Inc., a corporation of Delaware Application January 27, 1950, Serial No. 140,776

10 Claims. (Cl. 222—181)

The present invention relates to household food mixers, and particularly to an oil dropper attachment for use with such a mixer.

It has been customary with certain food mixers of the prior art to provide a so-called oil dropper attachment which could be used in combination with the mixer for the production of salad dressings. Such a device is customarily attached in some manner to the food mixer casing and is provided with a valve or metering device so that the desired oil can be introduced into the bowl drop by drop during the operation of the mixer.

One object of the present invention is to provide an improved form of construction for such an oil dropper attachment.

Another object is the provision of an oil dropper attachment which is relatively economical and simple in construction.

A further object is an oil dropper attachment in which a single supporting bracket fastened to the container serves both as a means for attaching the container to a food mixer part, and also as the sole bearing and support for the valve mechanism.

Other objects and advantages of the invention will be apparent from the following specification in which certain preferred embodiments are described with particular reference to the accompanying drawings.

In these drawings, wherein like reference characters indicate like parts,

Figure 1 is a partial side elevation, partly in section, of an oil dropper according to the present invention attached to a food mixer gear casing.

Fig. 2 is a perspective view of the oil dropper attachment of Fig. 1.

Fig. 3 is a perspective view of a modified form of support and bearing bracket for such an oil dropper attachment, and Fig. 4 is a similar partial perspective view of a further modification of the support and bearing bracket showing details of its attachment to the container of the device.

In Fig. 1, the oil dropper attachment of the present invention has been shown in combination with a food mixer of known construction. This food mixer has a motor or gear casing 10 which carries a beater 12. Beater 12 projects downwardly into a suitable bowl 14 in order to agitate and mix the contents of the bowl. In the form shown in Fig. 1 the beater 12 is carried by a planetary shaft 16, the general nature and construction of which are well known in the prior art.

The oil dropper attachment of the present invention includes a container designated generally at 18. The container includes side and bottom walls 20 and 22 respectively. The upper edge of the side walls 20 may be beaded at 24 to provide a reinforced edge at the open top of the container.

In the bottom wall 22 of the container 18, a suitable discharge opening or orifice is provided. In some cases, the orifice can be formed as an integral portion of the bottom wall 22. Preferably, however, the discharge orifice is provided by means of a separate insert which is mounted in an opening 26 in one edge of the bottom wall. This insert 28 may thus be a screw machine part which can be separately fabricated and then joined to the bottom wall 22 by welding or other desired methods.

Insert 28 includes a downwardly opening discharge orifice 30 through which the contents of container 18 may flow into mixing bowl 14. At its upper end, the discharge orifice or passage 30 is provided with a tapered valve seat 32, above which the opening or passage is of greater diameter as indicated at 34. The upper portion of insert 28 flares radially outwardly as indicated at 36, and these radial portions 36 are joined to the edges of opening 26 in the bottom wall 22 by welding at 38.

As shown in Figure 1, the bottom wall 22 is inclined slightly toward the discharge orifice 30. Thus the oil or other contents of container 18 will normally flow toward the orifice and the container can be drained completely.

In order to regulate the flow of liquid through the discharge orifice 30 a control member 40 is provided. This control member 40 is in the form of a rod of small diameter having a conical valve portion 42 at its lower end. The diameter of the rod portion 40 is substantially smaller than the internal diameter of the enlarged portion 34 of insert 28, so that the liquid in the container may flow downwardly through the annular space around rod 40 to the valve seat 32. The rate of flow of the liquid through the valve seat 32 and discharge orifice 30 will then depend upon the axial position of the control member or rod 40.

At its upper end, control member 40 has a threaded portion 44 which is carried by a suitable bearing portion 46. Bearing portion 46 includes an internally threaded substantially vertical bearing passage 47 which is in alignment with the valve seat 32 in insert 28.

At its upper end, control member 40 is provided with a knurled operating handle or knob 48 which projects above the container 18 and is thus accessible at the top of the oil dropper attachment for ready adjustment of the valve portion 42 in an axial or vertical direction in response to rotation of knob 48.

According to the present invention, a single bracket, designated generally at 50, is provided to serve as the supporting means for attachment of the oil dropper to a household food mixer and also to provide the bearing and support portion for the operating member 40 and valve 42. This supporting bracket 50 includes a downwardly extending flange or body portion 52 adapted to fit against the inner surface of the side wall 20 of container 18 adjacent the upper edge of the side wall. This depending flange 52 is fastened to the side wall 20 by welding at 53 or in any other desired manner.

As shown in Figs. 1 and 2, the main bearing portion 46 is formed as an integral portion of the supporting bracket 50, and is in the form of a projection on the depending flange or main support portion 52. Supporting bracket 50 also includes suitable means for attachment of the oil dropper to some portion of the food mixer with which it is to be used. In the present case this attaching means is in the form of a horizontally and radially projecting flange 54 extending outwardly from the upper edge of container 18 and bracket 50. An opening 56 is provided in horizontal supporting arm 54 for passage of a threaded member 58 to attach the bracket to the food mixer gear casing 19. The threaded attaching member 58 includes an enlarged or shouldered main body portion 64 and suitable projections 66 for manual rotation of the member. Threaded portion 58 is designed to pass through the opening 56 in horizontal supporting flange 54 and into an internally threaded opening 60 in the upper wall 62 of mixer casing 10. Thus the supporting bracket portion 54 will be firmly clamped between the upper wall 62 of the food mixer casing and the enlarged main body portion 64 of the attaching bolt.

Thus a construction has been provided which requires a minimum number of parts and in which expensive machining operations are avoided. The control member 40 and valve 42 are supported solely from the bearing portion 46 of the bracket 50, and therefore only the bracket 50 need have substantial thickness and strength while the container itself may be drawn or otherwise formed of relatively thin stock. Since the operating member is threaded into the bearing portion 46, the position of valve 42 with respect to valve seat 32 is controlled entirely by the interengaging portions on the control member 40 and the bearing portion 46. The necessity of providing a carefully machined insert 28 which would include threaded or bearing portions for the valve 42 is therefore avoided. Furthermore, as long as the bearing passage in portion 46 is substantially aligned with the valve seat 32, no critical dimensions or tolerances are required with respect to the distance from bearing portion 46 to valve seat 32. Threaded portion 44 may be long enough to accommodate all expected production variations in this spacing or distance, so that great accuracy in the manufacture of container 18 is not required. The device is readily attached to and removed from the food mixer casing 10 by mere rotation of the bolt or screw 58. At the same time the interengaging threads on valve member 40 and bearing portion 46 provide all necessary adjustment for the regulation of the flow of material through discharge orifice 30.

In Fig. 3 a modified form of supporting and attaching bracket has been shown. This bracket 68 includes a downwardly extending internal flange or body portion 70, which may be attached to the inner surface of the side wall of the container in the same manner as flange 52 of bracket 50. This depending body portion 70 includes an integral bearing projection 72 provided with a vertical internally threaded bearing passage 74 similar to the passage 47 of member 50. Similarly, the bracket 68 includes a horizontally and outwardly extending supporting flange 76. In this case, however, the supporting flange 76 is provided with a depending lug 78 at its outer end rather than with an opening such as opening 56 of bracket 50. Lug 78 is adapted for engagement in an opening in the upper wall of a food mixer casing, but does not require that the opening be threaded or that a separate attaching bolt, such as bolt 58, be used. Thus the construction of bracket 68 is one which permits the simple operation of hanging the attachment on the casing of a food mixer with stud 78 engaging a suitable recess or opening in the top wall of the casing.

In Fig. 4 another embodiment of the supporting bracket has been shown. Here the supporting bracket 80 includes a main horizontal portion extending outwardly from the upper rim of a container. The outer end of this horizontal supporting portion 82 may be provided with a depending flange 84 for engagement with a suitable slot in the top wall of a food mixer casing.

Adjacent the inner edge of the container 20 the bracket 80 includes a vertically depending internal flange 86—88. The intermediate portion of this flange is bent inwardly in U shape to provide vertically spaced substantially horizontal bearing legs 90 and 92 connected at their inner ends by a vertical portion 94. Threaded bearing passages 96 and 98 are provided in the respective horizontal legs 90 and 92, and these openings are in substantial alignment with a valve seat such as valve seat 32 of Fig. 1. Below the bottom horizontal leg 92 the end of the member 80 which is bent downwardly as shown at 88 forms, in effect, a continuation of the depending flange portion 86. Portions 86 and 88 are welded or otherwise fastened to the side wall 20 of the container.

Thus it is apparent that various modifications of the details of construction of the supporting bracket are possible without departure from the teachings of the present application. In all these embodiments, the supporting bracket performs the double function of providing means for attachment of the oil dropper to a part of a household food mixer and providing a bearing portion which constitutes the sole supporting means for the valve member or flow regulating device of the attachment.

Since minor variations and changes in the exact details of construction will be apparent to persons skilled in this field, it is intended that this invention shall cover all such changes and modifications as fall within the spirit and scope of the attached claims.

Now, therefore, I claim:

1. An oil dropper comprising a container having a bottom with a discharge opening therein, a supporting bracket fastened to the container and having a first integral portion extending outside the container and providing means for attachment to a food mixer to support the container thereon, a second integral portion of the bracket extending inside the container above said opening and having bearing means aligned with the opening, and a control member mounted and supported solely on said bearing means, the control member having a valve cooperating with the opening to regulate the flow of liquid from the container.

2. An oil dropper comprising a container having a bottom with a discharge opening therein, a supporting bracket fastened to the container and having a first integral portion extending outside the container and providing means for attachment to a food mixer to support the container thereon, a second integral portion of the bracket extending inside the container above said opening and having bearing means aligned with the opening, a control member mounted and supported solely on said bearing means, the control member having a valve cooperating with the opening, and interengaging means on the control member and bearing means for adjustment of the control member and valve with respect to the opening to regulate the flow of liquid from the container.

3. An oil dropper comprising a container having side and bottom walls with a discharge opening in the bottom wall, a supporting bracket fastened to a side wall of the container and having an outwardly projecting arm for attachment to a food mixer to support the container, a portion of the bracket extending above said discharge opening and having a threaded bearing passage aligned with the opening, and a control member having a threaded bearing portion engaging the passage and a valve portion cooperating with the opening to open and close the latter in response to rotation of the control member.

4. An oil dropper comprising a container having a bottom with an opening therein, an insert mounted in the opening and having a discharge orifice and a valve seat therein, a supporting bracket fastened to the container and having both an integral bearing portion aligned with the valve seat and an integral projection extending outside the container and providing means for attachment of the bracket to a food mixer member, and a control member mounted in the bearing portion and having a valve cooperating with the seat.

5. In an oil dropper comprising a container having a discharge opening therein, the improvement comprising a supporting member fastened to the container and having an integral projection extending outside the container and providing means for attachment to a food mixer member, the supporting member also having an integral bearing portion aligned with the opening, and a valve mounted solely in the bearing portion and cooperating with the discharge opening to open and close the latter.

6. In an oil dropper comprising a container having side and bottom walls and a discharge opening in the bottom wall, the improvement comprising a single supporting member fastened to a side wall of the container and having a bearing portion, and a valve mounted solely in the bearing portion and cooperating with the opening to open and close the latter, said supporting member including a laterally projecting arm extending outwardly from the container for engagement with an external support, said arm being provided with an opening.

7. In an oil dropper comprising a container having side and bottom walls and a discharge opening in the bottom wall, the improvement comprising a single supporting member fastened to a side wall of the container and having a bearing portion, and a valve mounted solely in the bearing portion and cooperating with the opening to open and close the latter, said supporting member including a laterally projecting arm extending outwardly from the container for engagement with an external support, said arm having a depending stud at its outer end.

8. In an oil dropper comprising a container having side and bottom walls and a discharge opening in the bottom wall, the improvement comprising a single supporting member fastened to a side wall of the container and having a bearing portion, and a valve mounted solely in the bearing portion and cooperating with the opening to open and close the latter, said supporting member consisting of a single strip of metal having a horizontal supporting arm projecting outwardly from the top of the container, and a downwardly extending flange inside the container and engaging the inner surface of a side wall, an intermediate portion of the flange being deformed inwardly and providing vertically spaced horizontal bearing legs joined by a vertical section spaced inwardly from the wall, the bearing legs having internally threaded bearing passages aligned with the discharge opening.

9. An oil dropper according to claim 8 in which the horizontal supporting arm terminates in a depending flange at its outer end.

10. An oil dropper comprising a container having side and bottom walls and a discharge opening at one edge of the bottom wall, a supporting bracket, a main bearing portion fastened to the inner surface of the side wall above the opening and a supporting portion extending outwardly beyond the upper edge of the side wall for attachment to a food mixer member, the bearing portion having an internally threaded passage aligned with the opening, and an operating member threaded into the bearing passage and having a handle accessible at the top of the container and a valve cooperating with the discharge opening to open and close the latter in response to rotation of the handle.

WALTER VAN GUILDER.

References Cited in the file of this patent

UNITED STATES PATENTS

| Number | Name | Date |
|---|---|---|
| 1,558,844 | Cronin | Oct. 27, 1925 |